July 3, 1956 C. S. MERTLER 2,753,437
COMBINATION PURPOSE THERMOSTAT
Filed June 16, 1951 2 Sheets-Sheet 1

INVENTOR.
CHARLES S. MERTLER
BY
Woodling and Krost,
attys.

July 3, 1956

C. S. MERTLER 2,753,437

COMBINATION PURPOSE THERMOSTAT

Filed June 16, 1951

INVENTOR.
CHARLES S. MERTLER
BY
Woodling and Krost,
attys.

United States Patent Office 2,753,437
Patented July 3, 1956

2,753,437

COMBINATION PURPOSE THERMOSTAT

Charles S. Mertler, Mansfield, Ohio, assignor to Stevens Manufacturing Company, Inc.

Application June 16, 1951, Serial No. 232,026

16 Claims. (Cl. 219—44)

This invention relates to fluid heating structures generally, and relates more specifically to automatic coffee makers having a coffee making cycle followed by a temperature maintenance cycle.

The invention, set forth broadly, and the object of the invention, is to provide a thermostat which will control an electrical apparatus throughout two temperature ranges with the second being entirely within the first. The apparatus is caused to commence operation and to change temperature in a first direction passing entirely through the first temperature range to the most remote limit thereof, where upon a first set of contacts on the thermostat change to a different condition so that the apparatus is caused to change temperature in the opposite direction passing entirely through the second temperature range to the remote limit thereof, whereupon a second set of contacts on the thermostat change to a different condition so that the apparatus is again caused to change temperature in the first direction. Additionally the second set of contacts controls the apparatus thereafter to hold the temperature thereof within said second temperature range until the apparatus is electrically de-energized.

An object of this invention is to provide a control for a fluid heater to cause the fluid to first heat to a high initial temperature, and thereafter maintain the fluid at a predetermined temperature lower than the initial temperature.

Another object of this invention is to produce a series of very short energization periods to the heating element in rapid succession for maintaining the lower temperature.

Another object of this invention is to make the control entirely responsive to the temperature of the material being heated until a predetermined temperature is obtained, whereafter the control is additionally heated from a second source and thereby only partially responsive to the temperature of the material being heated.

Other objects and a fuller understanding of the invention may be had by referring to the following description and claims, taken in conjunction with the accompanying drawings, in which:

Figure 4:
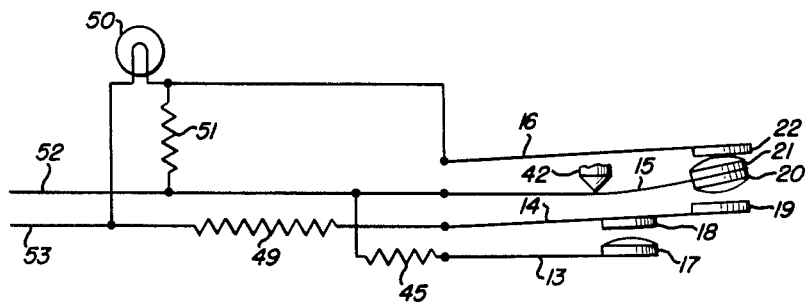
Figure 4 is a circuit diagram similar to Figure 3 with the thermostat stressed under the influence of high heat.
Figure 5:
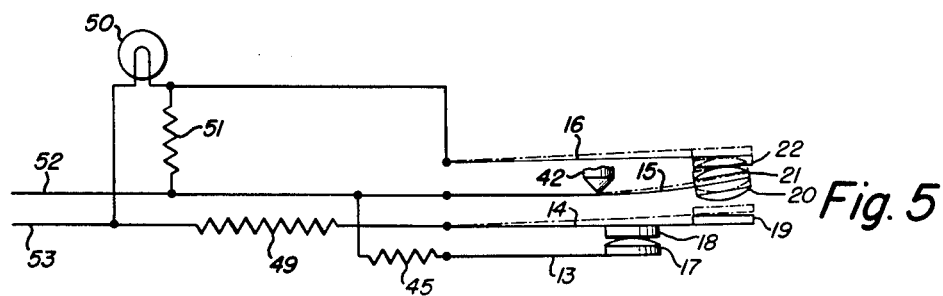
Figure 6:
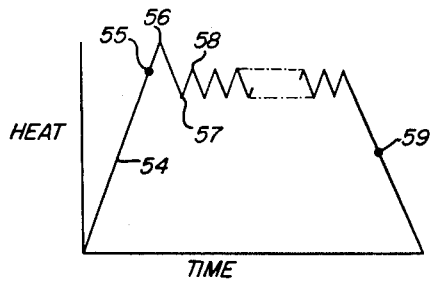

Figure 5 is a diagrammatic view of the thermostat showing relative positions of the contact strips, with the contact strips in phantom corresponding to the high temperature condition as shown in Figure 4, and the full lines illustrating a slightly lower temperature condition at the beginning of the warming cycle, but not to room temperature; and Figure 6 is a graph illustrating the heat and time relationship produced in a heating device controlled by this invention.

The preferred embodiment of the invention, as illustrated in the drawing, has a base 10, a stack 11 carried by the base 10, and a plurality of contact and actuation strips carried by the stack 11. The stack 11 is made up of first ends of a bi-metallic strip 12, a first contact strip 13, a second contact strip 14, a third contact strip 15 and a fourth contact strip 16. Each of the strips have first and second ends, with the first ends joined physically to form the stack 11, and electrically insulated one from the other in the stack 11. The second ends of the strips extend from the stack 11 in substantially parallel relationship one above the other in the order numbered. The first contact strip 13 is provided with a contact 17 on the end thereof. Contact strip 14 has a bottom contact 18 and a top contact 19. Contact strip 15 has a bottom contact 20 and a top contact 21. Contact strip 16 has a bottom contact 22.

The contact strip 13 is stressed to press upwardly at room temperature and move its contact 17 upwardly against the contact 18, which is carried on the bottom of the contact strip 14. The contact 19, carried on the upper side of contact strip 14 is positioned to engage the contact 20 carried on the bottom side of contact strip 15. The contact 21 is carried on the top of the second end of contact strip 15 and is thereby adapted to cooperate with the contact 22 which is carried on the bottom of contact strip 16.

The contact strip 14, in this preferred embodiment of the invention has a U-shaped end 23 composed of an upright portion 23A, and a return finger 23B. The finger 23B is looped back relative to the contact strip 23 at a distance therefrom determined by the length of the upright portion 23A. The U-shaped end 23 is thereby looped around the ends of the contact strips 15 and 16. The finger 23B carries a vertically adjustable post member 24 having an insulator point 25. The point 25 extends downwardly to contact the top of contact strip 16 and stress the contact strip 16 downwardly. The contact strip 16 is stressed to push against the point 25. Therefore, the U-shaped end 23 limits the separation of the contact strips 14 and 16 and produces a related movement of the two contact strips in the same direction.

An insulator button 30 is carried at the second end of the bimetallic strip 12 and is in contact with the bottom surface of the U-shaped contact strip 14. Therefore upon changeof temperature surrounding the bimetallic strip 12, physical force will be imparted through button 30 to the contact strip 14 and will swing the contact strip 14 through an arcuate path. The contact strip 16 follows with the same movement. In the embodiment of the invention illustrated, the bimetallic strip 12 is of the type which will move in the direction of contact strip 14 upon an increase of temperature. Therefore, as the temperature surrounding the bimetallic strip 12 is raised, the contact strip 14 will also rise and the point 25 of the post member 24 will rise an equal distance. Accordingly, the contact 19 and the contact 22 will rise a distance corresponding to the movement imparted by the bimetallic strip 12.

Figure 2:
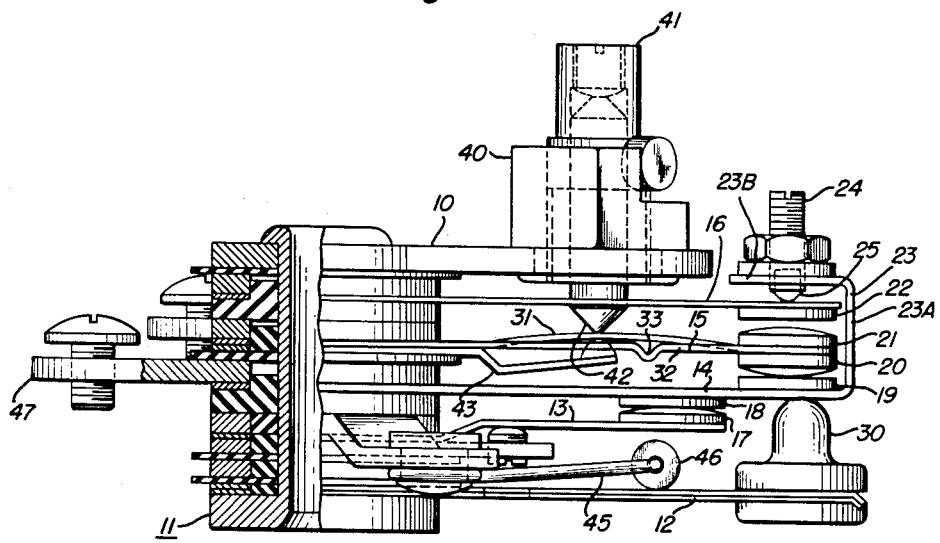
Figure 2 is an elevational view of the thermostat of Figure 1.

The contact strip 15 is of a snap-action over-center type of strip which may be of any suitable design to produce the well known snap-action when the strip is forced to swing through an arcuate path to unbalance the stresses manufactured into the strip. In Figure 2 of the drawings, the strip 15 is illustrated in the position it will normally assume at room temperature. The particular over-center snap-action strip illustrated in this embodiment of the invention has a center compression portion strip 31 and two lateral tension strips 32. The strips 32 are placed in tension by crimping them as indicated by the reference character 33. The snap-action contact strip 15 may be adjusted with regard to the position at which it will cease to swing through a steady arc and will produce a rapid snap-action, by holding the center compression portion 31 at a predetermined elevation. A change in the position with respect to the arc of swing of the strip 15 at which this center portion 31 is held, will change the position at which the snap-action will take place. In the illustrated embodiment of the invention, an internally threaded nut 40 is carried by the base 10, and a threaded screw 41 with an insulated tip 42 thereon is threaded into the nut 40. The tip 42 is thereby longitudinally adjustable in the nut 40 and provides an adjustable abutment point to engage the center strip 31 of the contact strip 15. A bottom abutment point to press the compression portion 31 tightly into contact with the insulated tip 42, is provided by means of a spring tension member 43.

An auxiliary heater 45 is positioned between the bimetallic strip 12 and the contact strip 13. In the illustrated embodiment, this auxiliary heater 45 is in the form of a single U-shaped loop of resistor wire passing through an insulator collar 46. The collar 46 is provided to hold the auxiliary heater 45 spaced from the strips 12 and 13. The contact strips 13, 14, 15 and 16 have terminals 47 so that these various contacts 17 to 22, inclusive, are able to be connected electrically to an external electrical circuit.

Figure 1:
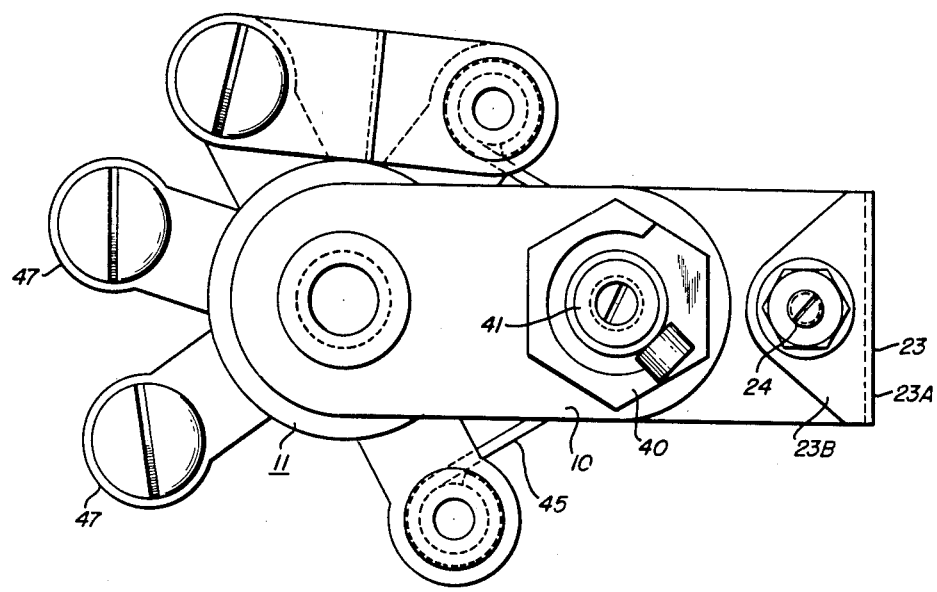
Figure 1 is a top view of a thermostat embodying the invention.
Figure 3:
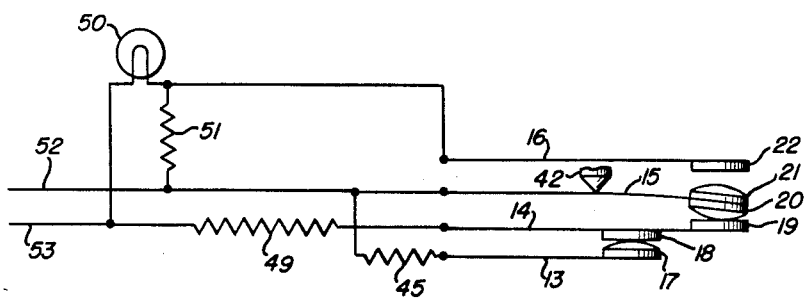
Figure 3 is a circuit diagram of the thermostat at room temperatures and connected in the circuit of a heating device.

The Figures 3 and 4 show diagrammatically the manner in which the thermostat contacts may be used with an external electrical circuit. By way of example, the combination purpose thermostat may be used with a heating device such as a coffee percolator, wherein one desires a brew cycle to extract the coffee and then a warming cycle to keep the liquid at a hot temperature below that which will cause re-percolation of the liquid. The Figures 3 and 4 show the external electrical circuit as including a main heater 49 and a pilot light 50. Power lines 52 and 53 are shown as being energizable from a suitable source of voltage, either alternating current or direct current. The line 52 is shown as being connected to the contact strip 15 and the line 53 is shown as being connected through the main heater 49 to the contact strip 14. The auxiliary heater 45 is connected between the contact strip 13 and the line 52. A series resistor 51 of fairly high resistance is connected in series with the pilot light 50 across lines 52 and 53 so that the pilot light, when energized through the resistor, will have only a glow of low brilliance. The fourth contact strip 16 is connected to the junction of the pilot light 50 and the series resistor 51. The thermostat shown in Figures 1 and 2 is designed to be built into a heating device, such as the coffee percolator, with the bimetallic strip 12 positioned to receive heat primarily from the water in the coffee percolator, and thus have a temperature indicative of the temperature of the water. The heat of the water will, of course, be controlled by the heat applied from the main heater 49. The auxiliary heater 45 is placed to impart heat to the bimetallic strip 12, in addition to that imparted by the main heater 49.

The physical operation of this combination purpose thermostat is now apparent. Heating of the bimetallic strip 12 will cause the contact strip 14 to swing through a definite arc in the direction urged by the bimetallic strip. The outer end of the contact strip 16 will move in a similar manner as the point 25 move with contact strip 14. Also, the over-center snap-action contact strip 15, which is normally stressed to press against the contact 19, carried by the contact strip 14, will likewise be moved through an arcuate path. When the movement first begins under the urging of the bimetallic strip, the snap-action strip 15 will move through a uniform arc of swing. However, at some arbitrary point determined by the adjustment of the point 42, the snap-action strip 15 will cease to move through a uniform swing corresponding to the movement of the bimetallic strip, and will suddenly snap away from the contact 19 and impinge against the contact 22, carried by the strip 16.

Before the contact strip 15 ceases its regular arcuate swing and produces a snap-action swing, the contacts 17 and 18 will have parted. Parting of the contacts 17 and 18 is assured by the structure of the contact strip 13.

After the snap-acting strip 15 has snapped-over to place the contacts 21 and 22 together, and separate the contacts 19 and 20, further movement of the bimetallic strip 12 will produce little further change in the relationship of the parts of the combination thermostatic switch. Return movement of the bimetallic strip 12 away from the stressed position which caused the snap-over of the strip 15, will allow the strip 14 to swing toward its original position. The swing of the strip 14 in this reverse direction will force the strip 16 to move in the reverse direction because of the contact thereof by the point 25, and therefore, will also force the snap-action strip 15 to begin swinging in the reverse direction. During the first portion of the return swing of the strip 15, the snap-action strip will move in a regular arcuate swing with the contacts 21 and 22 together. However, at some position along the return arcuate swing as determined by the position of the adjustable post 24, the snap-acting strip 15 twill again become unbalanced and a return snap-action swing will take place. The return snap-action will cause the contacts 21 and 22 to separate rapidly and the contact 20 will impinge upon the contact 19. The return snap-action of the strip 15 does not necesarily take place in the exact same location along the arcuate path of swing as the first separation snap-action. In fact, the positions where the snap-action begins is usually different in the two directions of swing in order to have stability of operation.

The construction of the contact strip 13, and the positions of the point 25 and tip 42, are such that the contacts 17 and 18 are brought together upon the return swing of the contact strip 14 prior to the snap-action of the strip 15 in the return direction of the swing. The operation of such a coffee percolator is started upon the energization of the electrical circuit as illustrated in Figure 3. The main heater 49 is energized through the contacts 19 and 20 to start the brewing cycle. This brewing cycle is identified by a glow of low brilliance of the pilot light 50 as a result of it being in series with the high resistance resistor 51. Also in the circuit during this period, and connected in parallel with contacts 19 and 20, is the auxiliary heater 45 connected through the contacts 17 and 18. However, due to the relatively higher resistance of the auxiliary heater 45 than the resistance of the contacts 19 and 20, this auxiliary heater 45 is rendered practically ineffective. As the coffee percolator heats due to the action of the main heater 49, the bimetallic strip 12 will be deflected upwardly. This upward deflection will first cause an opening of the contacts 17 and 18 at a first temperature. The Figure 6 shows a graph of heat versus time, and a line 54 on this graph shows that the temperature of the percolator initially increases from room temperature to the first temperature, which is indicated by the point 55. The continued upward deflection of the bimetallic strip 12 will eventually move the contact strip 14 up to a point which will cause the snap-over of the over-enter strip 15. It will be effected at a second temperature which is a temperature sufficient so that the percolator will have completed the brew cycle. This means that the temperature will have been sufficient to cause a percolation of the coffee, or the retained heat in the percolator will cause the completion of the percolation, so that the coffee is brewed. As the snap-over strip 15 snaps to the upper limit, the contacts 19 and 20 will open and hence the energization fo the main heater 49 will cease. This second temperature is indicated by the reference number 56 on the graph of Figure 6. This point 56 will be the highest temperature reached, and will indicate the end of the brewing cycle. Since the contact strip 15 has snapped over center, the contacts will be in the position shown in Figure 4, with the contacts 21 and 22 now in contact engaement. These contacts 21 and 22 are for the pilot light 50, and hence this pilot light will now glow at full brilliance since these contacts short out the resistor 51. This full brilliance glow of the pilot light 50 informs the operator that the coffee is ready for serving.

Should the coffee remain unserved, however, it will be maintained at a suitable serving temperature indefinitely by a warming cycle. This warming cycle is shown in Figure 6 to the right of the high point 56. As the percolator cools, the bimetallic strip 12 will move downwardly and the insulator point 25 will move the contacts 22 and 21 downwardly. This will move the over-center snap-action strip 15 downwardly toward the point at which it will snap-over in the oposie direction. However, before this snap-over point is reached, the contacts 17 and 18 will re-close at a third temperature. This point of closing is indicated by the reference character 57 in the graph of Figure 6. The position of the contacts at this instant of closing is shown in full lines in the Figure 5. With the contacts 17 and 18 closed, the electrical circuit will be from the line 52 through the auxiliary heater 45, through the contacts 17 and 18, and through the main heater 49 to the line 53. It will be seen that the auxiliary and main heaters are thus connected in series. The auxiliary heater 45 preferably has a low ohmic resistance so that the wattage output of the main heater 49 is not materially decreased and prevents a too rapid heating of the bimetallic strip 12 from the auxiliary heater 45 before the main heater 49 again has a chance to become hot. As the percolator is heated by the main heater 49, the temperature will increase and the bimetallic strip 12 will again be urged upwardly, before the strip 15 can snap over to bring contacts 19 and 20 together. In this warming cycle the bimetallic strip is heated both by the auxiliary heater 45 and by the heat of the brewed coffee. The heating of the coffee will continue until the first temperature is reached, which is shown graphically in Figure 6 by the reference character 58 and which is the same temperature as the point 55. The first and third temperatures 58 and 57 define the upper and lower limits of a first temperature differential which establishes the warming cycle. When the first temperature is reached at the point 58 shown graphically in Figure 6, the bimetallic strip 12 will have moved upward sufficiently so that the contacts 17 and 18 are again opened. This movement between the first and third temperatures is best shown in Figure 5, wherein the full lines illustrate the positions of the contacts at the third temperature of point 57, and the dotted lines illustrate the positions of the contacts at the first temperature of points 55 or 58. When the contacts 17 and 18 open, the main heater 49 and auxiliary heater 45 are both de-energized. Contacts 19 and 20 are still open at this time since the contact strip 15 has not snapped over-center in the return arc of swing. In the warming cycle, the contacts 17 and 18 are intermittently opened and close to maintain the coffee within this first temperature differential. The principal purpose of the auxiliary heater 45 is to radiate just enough heat to the bimetallic strip 12 to shorten the "on" cycles of the warming cycle to prevent re-percolation of the coffee. Upon external de-energization of the lines 52 and 53, the percolator will cool. As this bimetallic strip 12 cools to a fourth temperature, indicated graphically by a point 59 on Figure 6, the over-center strip 15 will snap to the downmost position. The second and fourth temperatures thus define a second temperature differential which is larger than the first temperature differential, and with the first temperature differential entirely within the second temperature differential. Since the circuit is de-energized, the closing of the contacts 19 and 20 will not cause the energization of the main heater 49. Since this over-center snap-strip 15 is moved to the downmost position, the percolator is thus ready for another cycle of coffee making.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electrical circuit for a coffee percolator including bimetallic means positioned in heat exchange relationship with said percolator, a main heater for said percolator, first flexible means, main contacts carried by said flexible means and operable by said bimetallic means to have on-and-off conditions defining a first operating range, means for energizing said main heater through said main contacts for a brew cycle to increase the temperature of said bimetallic means to an upper limit, establishment of said temperature at said upper limit causing said bimetallic means to open said main contacts to the off condition and thus end said brew cycle, second flexible means, warming contacts carried by said first and second flexible means and operable by said bimetallic means to have on-and-off conditions defining a second operating range wholly within said first operating range, decrease of temperature of said bimetallic means to the lower limit of said second opearting range effecting a closing of said warming contacts to the on condition, an auxiliary heater disposed near at least part of said bimetallic means to impart heat thereto, means for energizing said main heater and said auxiliary heater in series through said closed warming contacts to start a heating portion of a warming cycle, said bimetallic means upon reaching the upper limit of said second operating range opening said warming contacts to start a cooling portion of said warming cycle, said bimetallic means being positioned in better heat exchange relationship with said auxiliary heater than with said percolator to thus shorten the time required for said warming cycles.

2. A combination purpose thermostat, comprising, a base, a stack carried by said base, a bimetallic strip, first, second and third flexible strips, each of said strips having first and second ends, the first ends of said strips being carried by said stack and positioned in the order named with the second ends of said strips disposed substantially parallel, a first operating portion carried by the second end of said first flexible strip, second and third operating portions carried by the second end of said second flexible strip with said second operating portion disposed to cooperate with said first operating portion, a fourth operating portion carried by the second end of said third flexible strip with said fourth operating portion disposed to cooperate with said third operating portion, a U-shaped support carried by the second end of said second flexible strip, abutment means carried by said U-shaped support disposed to limit the movement of said third flexible strip, an abutment carried by the second end of said bimetallic strip disposed to engage the second end of said second flexible strip, said third flexible strip being a snap-action over-center device initially stressed so that said third and fourth operating portions are urged toward each other, said first and second operating portions being initially urged toward each other, temperature changes in a first direction causing movement of said bimetallic strip and said second flexible strip toward said third flexible strip to first separate said first and second operating portions and then causing said third flexible strip to snap-over center to separate said third and fourth operating portions, temperature changes in the opposite direction causing movement of said bimetallic strip in the opposite direction to effect first a converging of said first and second operating portions and then causing said third flexible strip to snap over-center.

3. A combination purpose thermostat, comprising, a base, a stack carried by said base, a bimetallic strip, first, second and third contact strips, each of said strips having first and second ends, the first ends of said strips being carried by said stack and positioned in the order named with the second ends of said strips disposed substantially parallel, a first contact carried by the second end of said first contact strip, second and third contacts carried by the second end of said second contact strip with said second contact disposed to cooperate with said first contact, a fourth contact carried by the second end of said third contact strip with said fourth contact disposed to cooperate with said third contact, a U-shaped support carried by the second end of said second contact strip, an insulator button carried by said U-shaped support disposed to limit the movement of the second end of said third contact strip, an insulator tip carried by the second end of said bimetallic strip disposed in engagement with the second end of said second contact strip, said third contact strip being a snap-action over-center device initially stressed so that said third and fourth contacts are in engagement, said first and second contacts being disposed initially in engagement, increasing temperature causing movement of said bimetallic strip and said second constant strip toward said third contact strip to first open said first and second contacts and then causing said third contact strip to snap-over center to open said third and fourth contacts, decreasing temperature causing movement of said bimetallic strip in the opposite direction to effect first a re-closing of said first and second contacts and then causing said third contact strip to snap over-center to close said third and fourth contacts.

4. A combination purpose thermostat, comprising, a base, a stack carried by said base, a bimetallic strip, first, second, third and fourth contact strips, each of said strips having first and second ends, the first ends of said strips being carried by said stack and positioned in the order named with the second ends of said strips disposed substantially parallel, a first contact carried by the second end of said first contact strip, second and third contacts carried by the second end of said second contact strip with said second contact disposed to cooperate with said first contact, fourth and fifth contacts carried by the second end of said third contact strip with said fourth contact disposed to cooperate with said third contact, a sixth contact carried by the second end of said fourth contact strip disposed to cooperate with said fifth contact, a U-shaped support carried by the second end of said second contact strip, an insulator button carried by said U-shaped support disposed to engage the second end of said fourth contact strip on the side thereof opposite said sixth contact, an insulator tip carried by the second end of said bimetalic strip disposed in engagement with the second end of said second contact strip, said third contact strip being a snap-action over-center device initially stressed so that said third and fourth contacts are in engagement and said fifth and sixth contacts are out of engagement, said first and second contacts being disposed initially in engagement, increasing temperature causing movement of said bimetallic strip and said second contact strip toward said third contact strip to first open said first and second contacts and then causing said third contact strip to snap-over center to open said third and fourth contacts and close said fifth and sixth contacts, decreasing temperature causing movement of said bimetallic strip in the opposite direction to effect first a re-closing of said first and second contacts and then causing said third contact strip to snap over-center to close said third and fourth contacts and open said fifth and sixth contacts.

5. A combination purpose thermostat, comprising, a base, a stack carried by said base, a bimetallic strip, first, second, third and fourth contact strips, each of said strips having first and second ends, the first ends of said strips being carried by said stack and positioned in the order named with the second ends of said strips disposed in spaced relationship, a first contact carried by the second end of said first contact strip, second and third contacts carried by the second end of said second contact strip with said second contact disposed to cooperate with said first contact, fourth and fifth contacts carried by the second end of said third contact strip with said fourth contact disposed to cooperate with said third contact, a sixth contact carried by the second end of said fourth contact strip disposed to cooperate with said fifth contact, a U-shaped support carried by the second end of said second contact strip, an insulator button carried by said U-shaped support disposed to engage the second end of said fourth contact strip on the side thereof opposite said sixth contact, an insulator tip carried by the second end of said bimetallic strip disposed in engagement with the second end of said second contact strip, said third contact strip having the property of substantially regular contact flexibility in a direction through a first flex portion of an arc of swing by the application of external force, followed by a rapid snap action by internally unbalanced stresses, and having substantially regular flexibility in a second direction through a second flex portion of the said arc of swing by the application of external force, followed by a rapid snap action by internally unbalanced stresses, said third contact strip being initially stressed so that said third and fourth contacts are in engagement and said fifth and sixth contacts are out of engagement, said first and second contacts being disposed initially in engagement, increasing temperature causing movement of said bimetallic strip and said second contact strip toward said third contact strip to first open said first and second contacts and then causing said third contact strip to move through said first flex portion of the arc of swing and snap-over center to open said third and fourth contacts and close said fifth and sixth contacts, decreasing temperature causing movement of said bimetallic strip in the opposite direction to move said over-center device through said second flex portion of the arc of swing to the snap position, said first and second contacts disposed to come into contact during the flexing of the over-center device in said second flex portion prior to its reaching the snap position, whereafter further movement of said bimetallic strip brings the over-center strip to the snap position to close said third and fourth contacts and open said fifth and sixth contacts.

6. A thermostat for control of a circuit, comprising main contacts, snap acting means and a thermoresponsive member operating on said main contacts to establish engaged and disengaged conditions of said main contacts, an auxiliary heater, auxiliary contacts, said thermoresponsive member adapted to be in heat exchange relationship with said circuit to actuate first said auxiliary contacts and next said main contacts from a first to a second condition with temperature changes in a given sense, means for connecting said main contacts to said circuit for control thereof, means for connecting said auxiliary heater and auxiliary contacts to said circuit for control thereof, said auxiliary heater being in heat exchange relationship with said thermoresponsive member, and said snap acting means being so constructed and arranged that for temperature changes in an opposite sense said auxiliary contacts are actuated from said second to said first condition before said main contacts are so actuated.

7. A thermostat for control of a main heater operable from a voltage source, comprising main contacts, snap acting means and a thermoresponsive member operating on said main contacts for a given temperature differential between engaged and disengaged positions of said main contacts, an auxiliary heater, auxiliary contacts, said thermoresponsive member adapted to be in heat exchange relationship with said main heater to actuate first said auxiliary contacts and next said main contacts from a normally engaged to a disengaged position with temperature changes in a given sense, first circuit means for connecting said main contacts to a voltage source and to said main heater for energization thereof, second circuit means for connecting said auxiliary heater and auxiliary contacts to said voltage source and said main heater for energization of both said heaters, and said snap acting means being so constructed and arranged that for temperature changes in an opposite sense said auxiliary contacts engage before said main contacts engage.

8. A thermostat for control of a main heater operable from a voltage source, comprising two main contacts, snap acting means carrying one of said main contacts, a thermoresponsive member operating on said main contacts for a relatively wide temperature differential between engaged and disengaged positions of said two main contacts, first and second auxiliary contacts, flex action means carrying said first auxiliary contact, means carrying said second auxiliary contact and the other of said main contacts, said thermoresponsive member adapted to be in heat exchange relationship with said main heater to actuate said auxiliary contacts from a normally engaged to a disengaged position at a first temperature with temperature changes in a given sense and to actuate said main contacts from a normally engaged to a disengaged position at a second temperature farther along in said given sense, first circuit means for connecting said main contacts to a voltage source and to said main heater for energization thereof, second circuit means for connecting said auxiliary contacts to said voltage source and said main heater for energization thereof, and said snap acting and flex action means being so constructed and arranged that for temperature changes in an opposite sense said auxiliary contacts engage before said main contacts engage.

9. A thermostat for control of a main heater operable from a voltage source, comprising two main contacts, a snap acting member carrying one of said main contacts for a relatively wide range of movement between engaged and disengaged positions of said two main contacts, an auxiliary heater, first and second auxiliary contacts, a first flex action member carrying said first auxiliary contact, a second flex action member carrying said second auxiliary contact and the other of said main contacts, a thermoresponsive member adapted to be in heat exchange relationship with said main heater to actuate said second flex action member to actuate said main contacts from a normally engaged to a disengaged position at a first temperature with temperature changes in a given sense, movement of said second flex action member with temperature changes in said given sense actuating said auxiliary contacts from a normally engaged to a disengaged position at a second temperature lower than said first temperature, first circuit means for connecting said main contacts to a voltage source and to said main heater for energization thereof, second circuit means for connecting said auxiliary heater and auxiliary contacts to said voltage source and said main heater for energization of both said heaters, said auxiliary heater being in heat exchange relationship with said thermoresponsive member to increase the time rate of movement of said thermoresponsive member relative to the time rate of movement of said thermoresponsive member when only said main heater is energized, said auxiliary contacts having a relatively smaller range of movement than that of said main contacts whereby for temperature changes in an opposite sense said auxiliary contacts engage at a temperature higher than the temperature at which said main contacts engage.

10. A thermostat for control of a main heater operable from a voltage source, comprising, main contacts and auxiliary contacts, a thermoresponsive member positioned to actuate both said main and auxiliary contacts, snap acting means acting on said main contacts to establish a larger temperature differential between off and on conditions than said auxiliary contacts, whereby the temperature differential of said auxiliary contacts lies wholly within said temperature differential of said main contacts, and means for connecting said contacts to control the energization of said heater from said voltage source.

11. A thermostat for control of main and auxiliary devices utilizing energy to change an ambient condition, comprising, first and second cooperable main elements, first and second cooperable auxiliary elements, means to move at least one main and one auxiliary element by changes in said ambient condition, each of said pairs of cooperable elements having a differential between first and second element conditions defined by first and second ambient conditions, means for connecting said main elements to said main device for control of the energy input thereto, means for connecting said auxiliary elements to said main and auxiliary devices for control of the energy input thereto, and means operating on at least one element to increase the differential between said first and second conditions of said cooperable main elements relative to the differential of said cooperable auxiliary elements.

12. A thermostat for control of a main heat exchanger, comprising, first and second cooperable main elements, first and second cooperable auxiliary elements, means to move at least one main and one auxiliary element by temperature changes, an auxiliary heat exchanger, each of said pairs of cooperable elements having a temperature differential defined by first and second alternate conditions, means for connecting said main elements to said main heat exchanger for control thereof, means for connecting said auxiliary elements to said main and auxiliary heat exchangers for control thereof, and means operating on at least one element to increase the temperature differential between said first and second conditions of said cooperable main elements relative to the temperature differential of said cooperable auxiliary elements.

13. A thermostat for control of a main heater, comprising, first and second cooperable main elements, first and second cooperable auxiliary elements, means to move at least one main and one auxiliary element by temperature changes, an auxiliary heater, each of said pairs of cooperable elements having a temperature differential defined by first and second alternate conditions, means for connecting said main elements to said main heater for control thereof, means for connecting said auxiliary elements to said main and auxiliary heaters for control of both heaters, and means operating on at least one element to increase the temperature differential between said first and second conditions of said cooperable main elements relative to the temperature differential of said cooperable auxiliary elements.

14. A thermostat for control of a main heater operable from a voltage source, comprising, first and second cooperable main contacts, first and second cooperable auxiliary contacts, means to move at least one main and one auxiliary contact by temperature changes, an auxiliary heater, each of said pairs of cooperable contacts having a temperature differential defined by first and second alternate conditions, means for connecting said main contacts to said main heater and said voltage source for control of said main heater, means for connecting said auxiliary contacts to said main and auxiliary heaters and said voltage source for control of both heaters, and means operating on at least one contact to increase the temperature differential between said first and second conditions of said cooperable main contacts relative to the temperature differential of said cooperable auxiliary contacts.

15. A combination purpose thermostat for use with energizing terminals and a main and an auxiliary heater, comprising, a base, a single bimetallic member carried by said base, a first double throw snap acting switch carried by said base and having first and second terminals and a switching element electrically contactable with said first and second terminals in first and second active positions, respectively, a second single throw creep acting switch carried by said base and having first and second terminals electrically connected and disconnected in first and second positions, respectively, of said second switch, an indicator lamp, first circuit means for connecting said main heater to said energizing terminals through said first switch when in said first position, said first switch in said second position opening said first circuit means and closing a second circuit means for connecting said energizing terminals to said indicator lamp, third circuit means for connecting said auxiliary and main heaters in series and to said energizing terminals through said second switch when in said first position, means for actuating both of said switches from said first to said second position by temperature responsive movements in a first direction of said bimetallic member, and means for actuating said second switch from said first to said second position at a temperature lower than the temperature at which said first switch changes from said first to said second position and upon opposite directional movements of said bimetallic member for actuating said second switch from said second to said first position at a temperature higher than the temperature at which said first switch changes from said second to said first position.

16. A combination purpose thermostat for use with energizing terminals and a main and an auxiliary heater, comprising, a base, a single bimetallic member adapted to be in heat exchange relationship with both said heaters and carried by said base, first and second flexible means on said base, a first snap acting switch on including said first flexible means and having first and second positions, a second creep acting switch including said first and second flexible means and having first and second positions, first circuit means for connecting said main heater to said energizing terminals through said first switch when in said first position, second circuit means for connecting said auxiliary and main heaters in series and to said energizing terminals through said second switch when in said first position, means for actuating both of said switches from said first to said second position by temperature responsive movements in a first direction of said bimetallic member, and means for actuating said second switch from said first to said second position at a temperature lower than the temperature at which said first switch changes from said first to said second position and upon opposite directional movements of said bimetallic member for actuating said second switch from said second to said first position at a temperature higher than the temperature at which said first switch changes from said second to said first position.

References Cited in the file of this patent
UNITED STATES PATENTS

| | | |
|---|---|---|
| 2,281,319 | Newell | Apr. 28, 1942 |
| 2,414,799 | Campbell | Jan. 28, 1947 |
| 2,504,728 | Purpura | Apr. 18, 1950 |
| 2,527,779 | Weiland | Oct. 31, 1950 |
| 2,667,565 | Wallower | Jan. 26, 1954 |